(12) United States Patent
Nica et al.

(10) Patent No.: US 8,145,621 B2
(45) Date of Patent: Mar. 27, 2012

(54) GRAPHICAL REPRESENTATION OF QUERY OPTIMIZER SEARCH SPACE IN A DATABASE MANAGEMENT SYSTEM

(75) Inventors: Anisoara Nica, Ontario (CA); Daniel Scott Brotherston, Ontario (CA); David William Hillis, Ontario (CA)

(73) Assignee: iAnywhere Solutions, Inc., Dublin, CA (US)

( * ) Notice: Subject to any disclaimer, the term of this patent is extended or adjusted under 35 U.S.C. 154(b) by 360 days.

(21) Appl. No.: 12/339,320

(22) Filed: Dec. 19, 2008

(65) Prior Publication Data

US 2010/0161589 A1   Jun. 24, 2010

(51) Int. Cl.
*G06F 7/00* (2006.01)
*G06F 17/30* (2006.01)

(52) U.S. Cl. ........ 707/713; 707/718; 707/719; 707/720; 707/721

(58) Field of Classification Search .................. 707/713, 707/714, 715, 716, 717, 718, 719, 999.3, 707/999.4, 720, 721
See application file for complete search history.

(56) References Cited

U.S. PATENT DOCUMENTS

| 7,370,043 | B1* | 5/2008 | Shelton et al. | 707/690 |
|---|---|---|---|---|
| 7,877,373 | B2* | 1/2011 | Zait | 707/713 |
| 7,877,377 | B2* | 1/2011 | Day et al. | 707/718 |
| 7,974,969 | B1* | 7/2011 | Balbirsky et al. | 707/713 |
| 2005/0071331 | A1* | 3/2005 | Gao et al. | 707/4 |
| 2006/0020573 | A1* | 1/2006 | Galindo-Legaria et al. | 707/1 |
| 2006/0074901 | A1* | 4/2006 | Pirahesh et al. | 707/5 |
| 2008/0114718 | A1* | 5/2008 | Anderson et al. | 707/2 |

OTHER PUBLICATIONS

Kulkarni et al., "Exhaustive Optimization Phase Order Space Exploration", IEEE, Mar. 2006, pp. 1-7. Download: http://ieeexplore.ieee.org/stamp/stamp.jsp?tp=&arnumber=1611550.*

* cited by examiner

*Primary Examiner* — Hares Jami
(74) *Attorney, Agent, or Firm* — Sterne, Kessler, Goldstein & Fox PLLC

(57) ABSTRACT

A system, method, and computer program product are provided for generating a graphical representation of a query optimization process. The method comprises the steps of parsing a search space log, presenting one or more evaluated access plans on an axis of a timeline, identifying a best access plan on the timeline, and outputting a graphical representation of the timeline. An additional system, method, and computer program product are provided for recording a query optimization process of a query optimizer.

21 Claims, 7 Drawing Sheets

GRAPHICAL REPRESENTATION OF QUERY OPTIMIZER SEARCH SPACE IN A DATABASE MANAGEMENT SYSTEM

BACKGROUND OF INVENTION

1. Field of the Invention

The present invention relates generally to databases and, more specifically, to query optimizers.

2. Description of the Background Art

Computer databases have become a prevalent means for data storage and retrieval. A database user will commonly access the underlying data in a database using a Database Management System ("DBMS"). A user issues a query to the DBMS that conforms to a defined query language. This simplifies the user's interactions with the database by not requiring that the user know or understand the underlying structure of the physical database. Because of this, however, it is imperative that the DBMS execute the query in a manner which is most efficient for the underlying database.

DBMSs commonly include query optimizers in order to determine the most efficient way to execute a query. Effective design of the query optimizer is critical to producing an efficient DBMS.

The query optimizer analyzes the query and produces an access plan. This includes, for example, choosing the access method for each table accessed, choosing the order in which to perform a join operation on the tables, and choosing the join method to be used in each join operation. As there are typically many strategies for executing a given query using combinations of these operations, the optimizer will generate and evaluate a number of strategies from which to select the best one by way of an enumeration process (or "search space generation process"). Further discussion of optimizer strategies is provided in commonly-owned U.S. Pat. No. 7,184,998, issued Feb. 27, 2007, which is herein incorporated by reference in its entirety.

While developing enhancements to the query optimizer, it is difficult to determine why the particular access plan was ultimately chosen. Since this information is helpful in order to refine this critical component for maximal performance, a query optimizer architect needs to be aware of how the optimizer is responding to various scenarios. Accordingly, what is desired is a means to visualize the performance of the query optimizer and to compare optimization logs obtained in different scenarios.

SUMMARY OF INVENTION

Embodiments of the invention include a method for generating a graphical representation of a query optimization process. The method includes the steps of parsing a search space log, the log comprising, an order in which one or more evaluated access plans were evaluated, a property for an object of one of the one or more evaluated access plans, and a best access plan selected from the one or more evaluated access plans. The method further includes the steps of presenting the one or more evaluated access plans on an axis of a timeline, the timeline corresponding to the order, identifying the best access plan on the timeline, and outputting a graphical representation of the timeline.

Further embodiments of the invention include a system for generating a graphical representation of a query optimization process. The system includes a parsing module to parse a search space log, the log comprising an order in which one or more evaluated access plans were evaluated, a property for an object of one of the one or more evaluated access plans, and a best access plan selected from the one or more evaluated access plans. The system further includes a presenting module to present the one or more evaluated access plans on an axis of a timeline, the timeline corresponding to the order, an identifying module to identify the best access plan on the timeline, and an outputting module to output a graphical representation of the timeline.

Additional embodiments of the invention include a computer program product comprising a computer-usable medium having computer program logic recorded thereon for enabling a processor to generate a graphical representation of a query optimization process. The computer program logic includes parsing means for enabling a processor to parse a search space log, the log comprising an order in which one or more evaluated access plans were evaluated, a property for an object of one of the one or more evaluated access plans, and a best access plan selected from the one or more evaluated access plans. The computer program logic further includes presenting means for enabling a processor to present the one or more evaluated access plans on an axis of a timeline, the timeline corresponding to the order, identifying means for enabling a processor to identify the best access plan on the timeline, and outputting means for enabling a processor to output a graphical representation of the timeline.

Moreover, embodiments of the invention include a method for recording a query optimization process of a query optimizer. The method includes the steps of generating an access plan, the access plan comprising an object, evaluating the access plan, logging an object of the access plan, logging a property for the object, logging an order in which the access plan was evaluated, logging a best access plan, determining whether to evaluate an additional access plan, and logging a result of the determining whether to evaluate the additional access plan.

Even further embodiments of the invention include a system for recording a query optimization process of a query optimizer. The system includes a generating module to generate an access plan, the access plan comprising an object, an evaluating module to evaluate the access plan, a first logging module to log an object of the access plan, a second logging module to log a property for the object, a third logging module to log an order in which the access plan was evaluated, a fourth logging module to log a best access plan, a determining module to determine whether to evaluate an additional access plan, and a fifth logging module to log a result of the determining whether to evaluate the additional access plan.

Yet another embodiment of the invention includes a computer program product comprising a computer-usable medium having computer program logic recorded thereon for enabling a processor to record a query optimization process of a query optimizer. The computer program logic includes generating means for enabling a processor to generate an access plan, the access plan comprising an object, evaluating means for enabling a processor to evaluate the access plan, first logging means for enabling a processor to log an object of the access plan, second logging means for enabling a processor to log a property for the object, third logging means for enabling a processor to log an order in which the access plan was evaluated, fourth logging means for enabling a processor to log a best access plan, determining means for enabling a processor to determine whether to evaluate an additional access plan, and fifth logging means for enabling a processor to log a result of the determining whether to evaluate the additional access plan.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
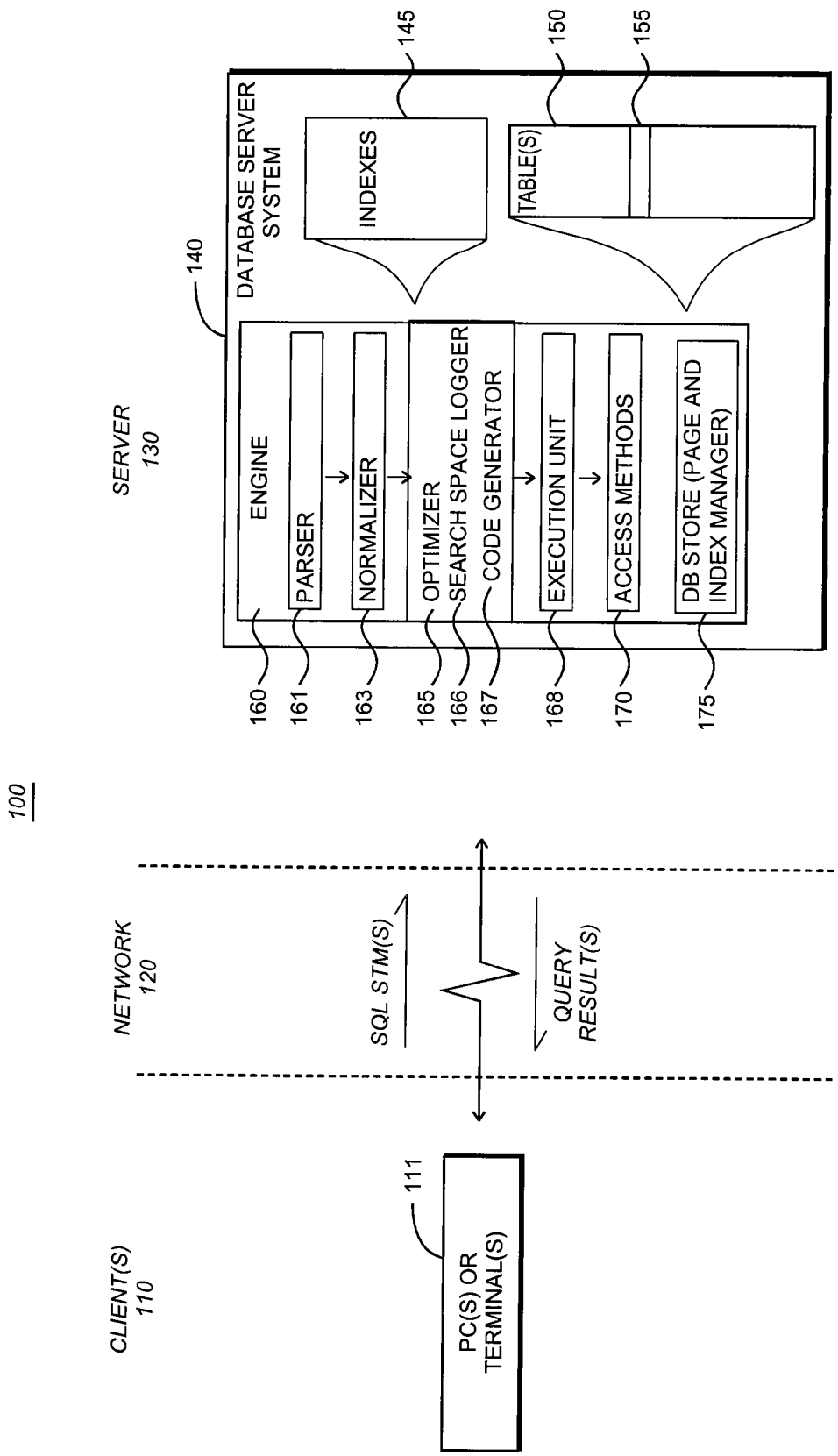
FIG. 1 is an example database interface in which embodiments of the present invention can be implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 is an example database interface 100 in which embodiments of the present invention can be implemented. A client 110 is operable to communicate with a database server 130 using DBMS server system 140. Although client 110 is represented in FIG. 1 as a separate physical machine from database system 140, this is presented by way of example, and not limitation. In an additional embodiment of the present invention, client 110 occupies the same physical system as database system 140. In a further embodiment of the present invention, client 110 is a software application which requires access to database system 140, where in an additional embodiment of the present invention client 110 is a human user manually requesting access to database system 140. Throughout this specification, the terms client and user will be used interchangeably to refer to any hardware, software, or human requestor accessing database system 140 either manually or automatically, such as client 110.

DBMS 140 receives a query from client 110. The query is used to request, modify, append, or otherwise manipulate information in database storage 175. This query is presented to DBMS by client 110 using syntax which conforms to a query language. In an embodiment of the present invention, the query language is the Structured Query Language ("SQL"). DBMS 140 is able to interpret the query in accordance with the query language to generate requests to database storage 175.

In accordance with an embodiment of the present invention, the query is passed to query optimizer 165. Query optimizer 165 is able to determine an approach in which to manipulate the information of database storage 175 in accordance with the query semantics. This approach is commonly termed an "access plan," or "query plan." Based on the considerations programmed into query optimizer 165 in selecting an appropriate access plan, query optimizer 165 is able to select a "best" access plan. One skilled in the relevant art will appreciate that the "best", or "optimal", access plan selected by query optimizer 165 is not necessarily the absolute optimal access plan which could be implemented, but rather an access plan which is deemed by rules designed into the query optimizer 165 to be the best of those access plans as determined by some objective or subjective criteria. This access plan is then used to manipulate data in database storage 175 in order to resolve the query.

In order to aid developers of query optimizer 165 in determining how query optimizer 165 considers and selects an access plan, logger 166 is used to log many aspects of the query optimizer's 165 process, in accordance with an embodiment of the present invention.

In accordance with an embodiment of the present invention, the query optimizer 165 records the search space log if and only if a tracing mode is set. In accordance with a further embodiment of the present invention, the tracing mode is set if and only if a request for the graphical plan of a query is processed. The log is attached to the result of the graphical plan request, and the result of the request is sent back to the client which generated the request. In an additional embodiment of the present invention, the result is saved in a file. One skilled in the relevant arts will appreciate that the search space log can be stored by other methods, and the aforementioned methods are shown by way of example, and not limitation.

In accordance with a further embodiment of the present invention, the query optimizer is able to generate the search space logs at a customer-side system, such as in a production environment, without affecting overall DBMS performance. By generating search space logs in this manner, the log size is typically very small, which further facilitates working with search space logs at a customer-side system.

II. Query Optimizer Behavior

Figure 2:
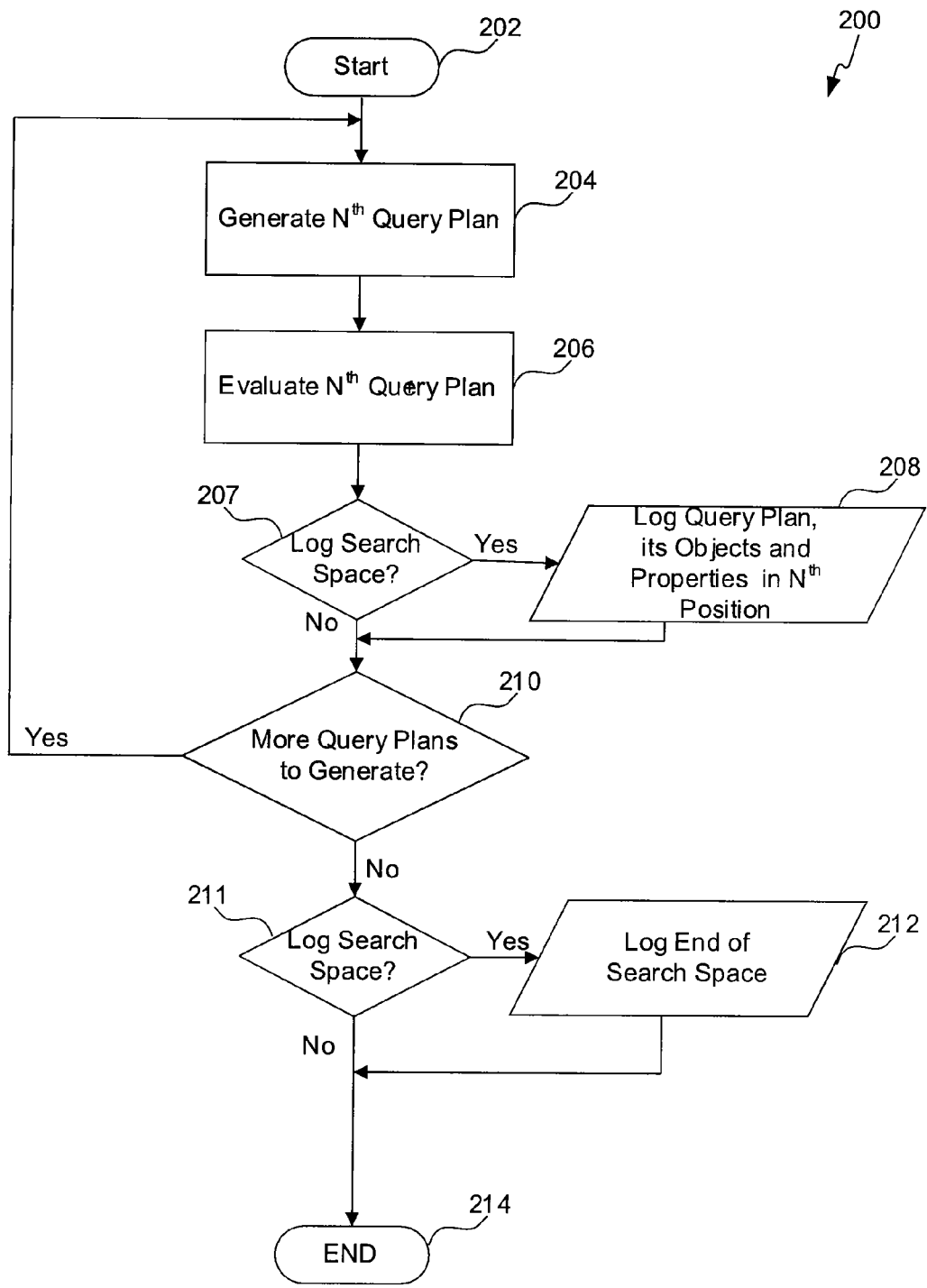
FIG. 2 is a flowchart illustrating steps by which a query optimizer is operable to select an access plan and log the search process, in accordance with an embodiment of the present invention.
Figure 3:
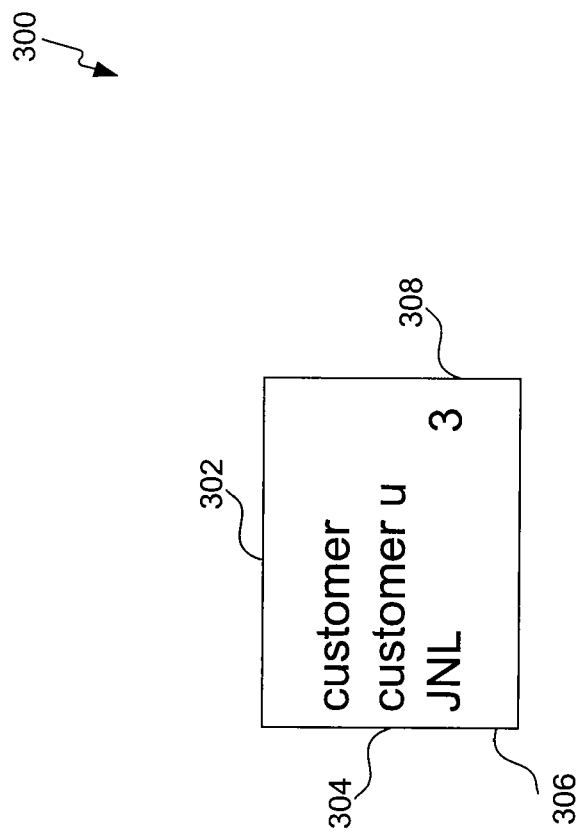
FIG. 3 is an example object represented graphically, in accordance with an embodiment of the present invention.

FIG. 2 is a flowchart 200 illustrating steps by which a query optimizer, such as query optimizer 165, is operable to select an access plan and log the search process, in accordance with an embodiment of the present invention. The method begins at step 202 and proceeds to step 204 where an access plan is generated by determining the objects associated with the access plan. At step 206, the access plan is evaluated. In accordance with an embodiment of the present invention, properties including cost and best access plan found so far are evaluated. In accordance with a further embodiment of the present invention, an object corresponds to a discrete access function performed on the database storage, such as database storage 175. FIG. 3 is an example of a single object 300 and its properties represented graphically, in accordance with an embodiment of the present invention. In accordance with a further embodiment of the present invention, object 300 includes a table name 302 on which an operation is performed, an access method 304, a join method 306, and a hierarchy level 308.

A set of one or more objects forms a particular access plan. This access plan is responsive to a query, but is not necessarily the only access plan that can be responsive. Accordingly, at step 208 the access plan, the objects comprising it, and its properties are logged by a logger 166, in accordance with an embodiment of the present invention. In accordance with a further embodiment of the present invention, the logging of step 208 occurs if a tracing mode is on, as determined at step 207. At step 210, a determination is made as to whether additional access plans are considered. The query optimizer 165 may, for a number of reasons inherent to its particular design, determine that it is or is not worth searching for additional access plans that resolve the query. If the query optimizer 165 determines that additional access plans should be searched, the method returns to step 204 and proceeds with the next access plan. Otherwise, the method proceeds to step 212 where logger 166 logs that the query optimizer has made the decision to terminate its search, in accordance with an embodiment of the present invention. In accordance with a further embodiment of the present invention, the logging of step 212 occurs if a tracing mode is on, as determined at step 211. The method ends at step 218.

The particular evaluation methodology used by the query optimizer 165 does not need to follow these precise steps, as one of the uses of logging data from the query optimizer 165 is to refine the evaluation methodology. One evaluation methodology may be better suited for a certain application than another evaluation methodology, where the other evaluation methodology may be better suited for another application than the one evaluation methodology. The ability to compare the results of an evaluation methodology process is therefore useful in proper query optimizer design.

III. Optimizer Logging

The logger 166 of FIG. 1 creates a log for each search space generation process by a logging mechanism, as previously discussed, in accordance with an embodiment of the present invention. The content of these logs represents the responses of the query optimizer 165 as discussed with regard to flowchart 200 of FIG. 2. By way of example, and not limitation, a format for the logs in accordance with an embodiment of the present invention is discussed.

In accordance with an embodiment of the present invention, the log is presented with the use of markup tags. In an embodiment, a <senum> </senum> markup tag block contains a set of enumerations representing all access plans in a search space. In a further embodiment, a <dict> </dict> markup tag block contains a dictionary for an entry in the <senum> block.

In an additional embodiment of the present invention, the <senum> block comprises one or more lists of one or more items each. An example <dict> block entry, "(2,1) B=PRODUCTS" is used to translate the first item in the second list from 'B' to a base table name 'PRODUCTS'. Use of a <dict> block is optional, with the potential advantage of improving the compactness of the <senum> block. If a <dict> block is not used, then the <senum> block is parsed without substitution.

In accordance with an embodiment of the present invention, an entry in a <senum> block has the format "LIST 1/LIST 2/LIST 3/LIST 4/LIST 5/LIST 6/ . . . /LIST 10". If a list is empty it is represented as "//", e.g., " . . . /LIST m // LIST m+2". In accordance with a further embodiment of the present invention, each of the lists has the following format:

List 1:
global id—identifies this entry in the log and can be used later in the log to point to this entry
Property 1, . . . , n—list of properties of this entry—for example, this list may contain physical properties such as materialization properties or pruning type. This list can have a variable length with the assumption that the items not provided have default values, in accordance with an embodiment of the present invention. If an item in any list is skipped (i.e., it has a default value) but there are still some entries after it, the format used is " . . . , item k, item k+2, item k+5, . . . "

List 2:
Operator id

List 3:
global id of child 1, global id of child 2, global id of child 3, . . .

List 4:
List of predicates applied to the operator id in list 2

List 5:
List of properties evaluated for the operator id in list 2

An example log created using these rules for the enumerated prefix access plan:

(PRODUCT<seq>)JOIN NESTED LOOPS (SALE<idx1SALE.PROD_ID=PRODUCT.ID>)

can be represented as follows using the aforementioned rules:

```
1, P/seq scan///10.0, 21.5
2, P/PRODUCT/1//10.0, 21.5
3, P/idx1//SALE.PROD_ID=PRODUCT.ID/12.0, 30.2
4, P/SALE/3//12.0.30.2
5, P/JOIN NESTED LOOPS/2,4//50.0, 100.5
```

This representation would appear inside a <senum> block in accordance with an embodiment of the present invention.

In accordance with an embodiment of the present invention, the search space logs are generated as a "data dump," whereby a user of a database system can save the logs for later analysis. For example, a user of a database system which is experiencing some slowdown can generate a data dump of the access logs and transmit this data to the database system developer. The database system developer can in turn make changes to the query optimizer to improve the performance of the database system to resolve the user's slowdown issue.

IV. Graphical Representation

Figure 4:
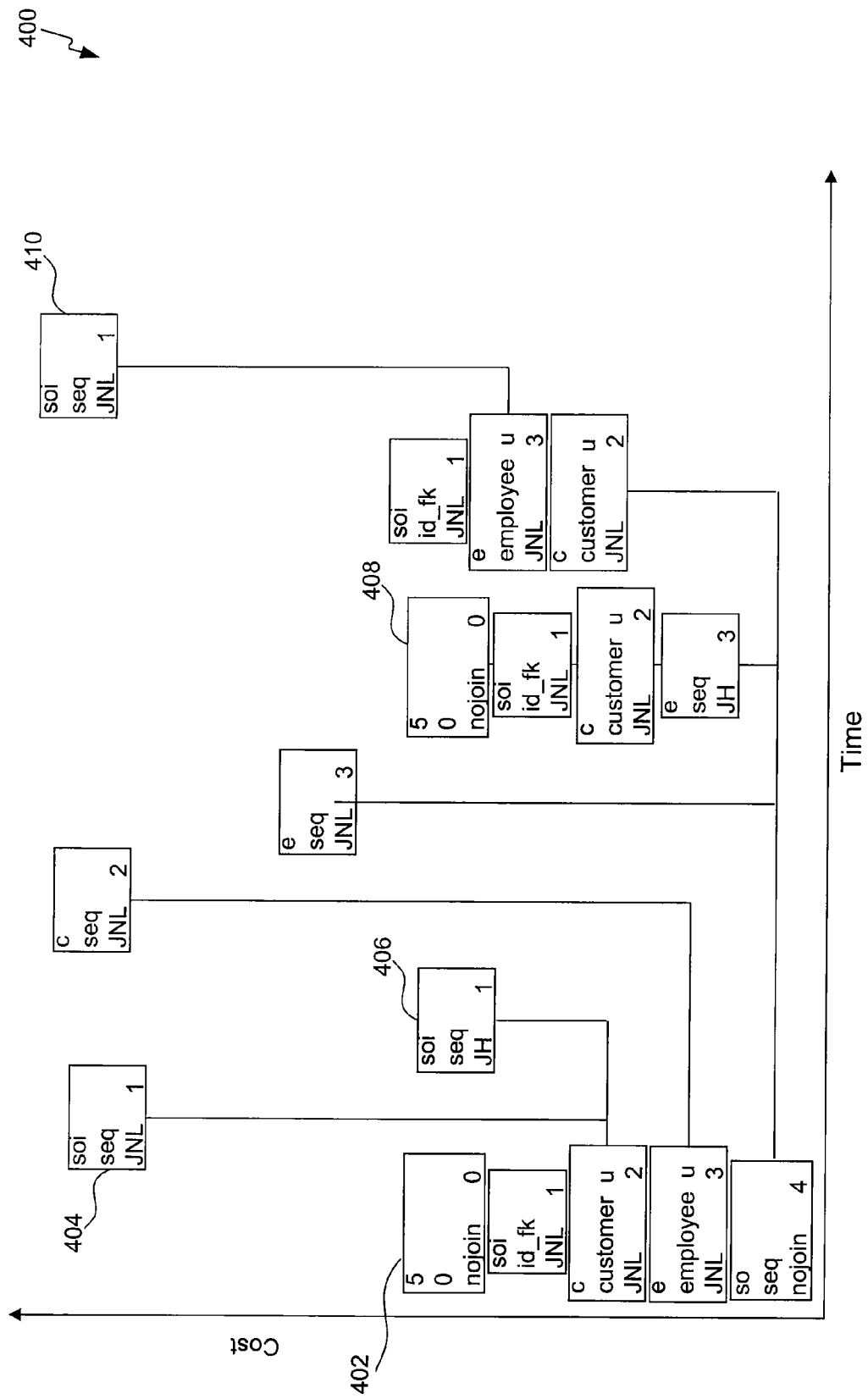
FIG. 4 is an exemplary graphical representation of a set of evaluated access plans on a timeline, in accordance with an embodiment of the present invention.

FIG. 4 is an exemplary graphical representation of a set of evaluated access plans on a timeline 400, in accordance with an embodiment of the present invention. Each access plan, such as access plan 402, is comprised of one or more objects, such as object 300 of FIG. 3.

As shown in the timeline 400, a number of access plans are presented from left to right in the order in which they were evaluated by a query optimizer. For example, access plan 402 was evaluated by the query optimizer prior to access plan 404, and both prior to access plan 406. Additionally, in this example, access plan 402 has been selected as the "best" access plan along with access plan 408, as both represent the best estimated cost found so far among full access plans generated by the optimizer, with execution cost being the objective metric used for selecting the "best" access plan. The estimated cost is shown by the height of each of the objects on the timeline 400 (i.e., the Y axis of timeline 400). The selection of a "best" plan is shown, in accordance with an embodiment of the present invention, by bolding the boxes of the objects comprising the "best" access plan.

One of the advantages of this graphical depiction is to enable a developer to reduce the search requirements for identifying a reasonable "best" access plan. If, for example, the "best" access plan was located far along the time axis of the graphical representation, a developer of the query optimizer could take note of this and adjust the query optimizer so that it considers the presumed "best" access plan sooner in the evaluation process in the future.

In this example graphical representation, access plan 402 is the first access plan which was considered by the query optimizer, and as such it is shown at the earliest time position. The complete access plan comprises five objects, shown stacked above each other, each representing a query object. The total cost of the access plan is depicted by the position of the top of the stack along the cost axis (shown as the graph's vertical axis).

The next access plan considered by the query optimizer was access plan 404, which is shown next on the time axis. This access plan has the same first three objects in common with access plan 402, but the next object is shown as connected by a vertical line, high on the cost axis. This suggests that the cost of this object was significant, placing the cost of access plan 404 after four objects at a much higher value than the complete access plan 402. Consequently, the graphical representation of timeline 400 does not show the next object of access plan 404 because the query optimizer did not consider it, as access plan 404 was already considered less optimal than access plan 402. This indicates that the query optimizer pruned all possible access plans prefixed by access plan 404. Consequently, the next access plan considered was access plan 406, and so on.

The final access plan considered in the example graphical representation of timeline 400 is access plan 410, which was considered a non-best access plan for similar reasons as access plan 404. However, there are no further access plans considered subsequent to access plan 410, which suggests that either no further access plans were available, or the query optimizer closed the search space to further access plans. By being able to visualize an action by the query optimizer to close the search space, a developer of the query optimizer can note the potential for access plans which were not timely considered, and enable the query optimizer to consider these access plans sooner.

Moreover, a developer can run an identical query two or more times on a database system, where the system is in a different state each time. The graphical representations of the query optimizer's responses in each case can be compared to each other to see the effects of the state changes.

Figure 5:
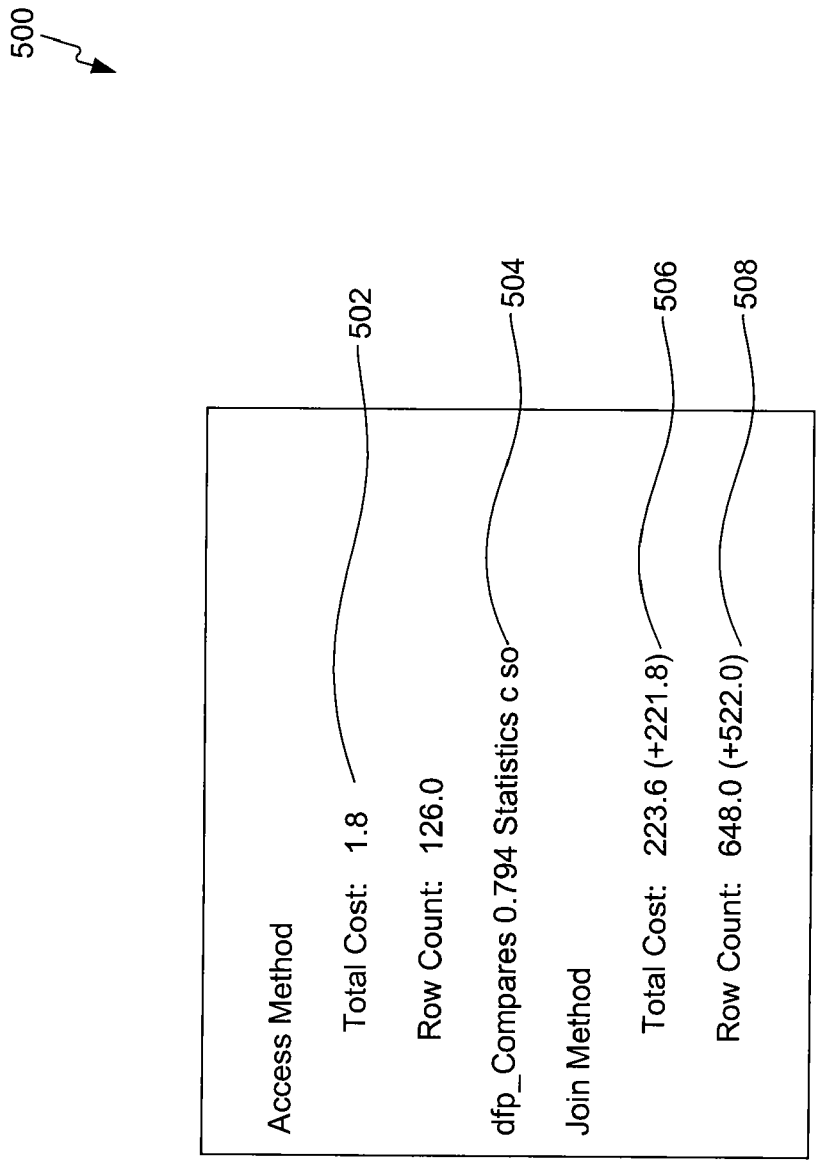
FIG. 5 illustrates an information box for an object, in accordance with an embodiment of the present invention.

FIG. 5 illustrates an information box 500 for an object, in accordance with an embodiment of the present invention. In accordance with a further embodiment of the present invention, the information box is presented when a user hovers a mouse cursor over an object. In accordance with an additional embodiment, the information box is presented in a separate pane or window when a user clicks on an object. One skilled in the relevant arts will appreciate that additional methods for displaying the information box 500 can be used, as well as for displaying the contents of information box 500, and the aforementioned methods are presented by way of example, and not limitation.

The information box displays, in accordance with an additional embodiment of the present invention, properties of that object in the context of the search space. For example, a total cost of an access method 502, a predicate applied on the access method 504, a total cost of a join method and the access method 506, and the cost of the join method by itself 508 are shown. One skilled in the relevant arts will appreciate that other information gathered in the log can be displayed or used to compute and then display useful statistics, used by the optimizer during optimization process, to a user.

Figure 6:
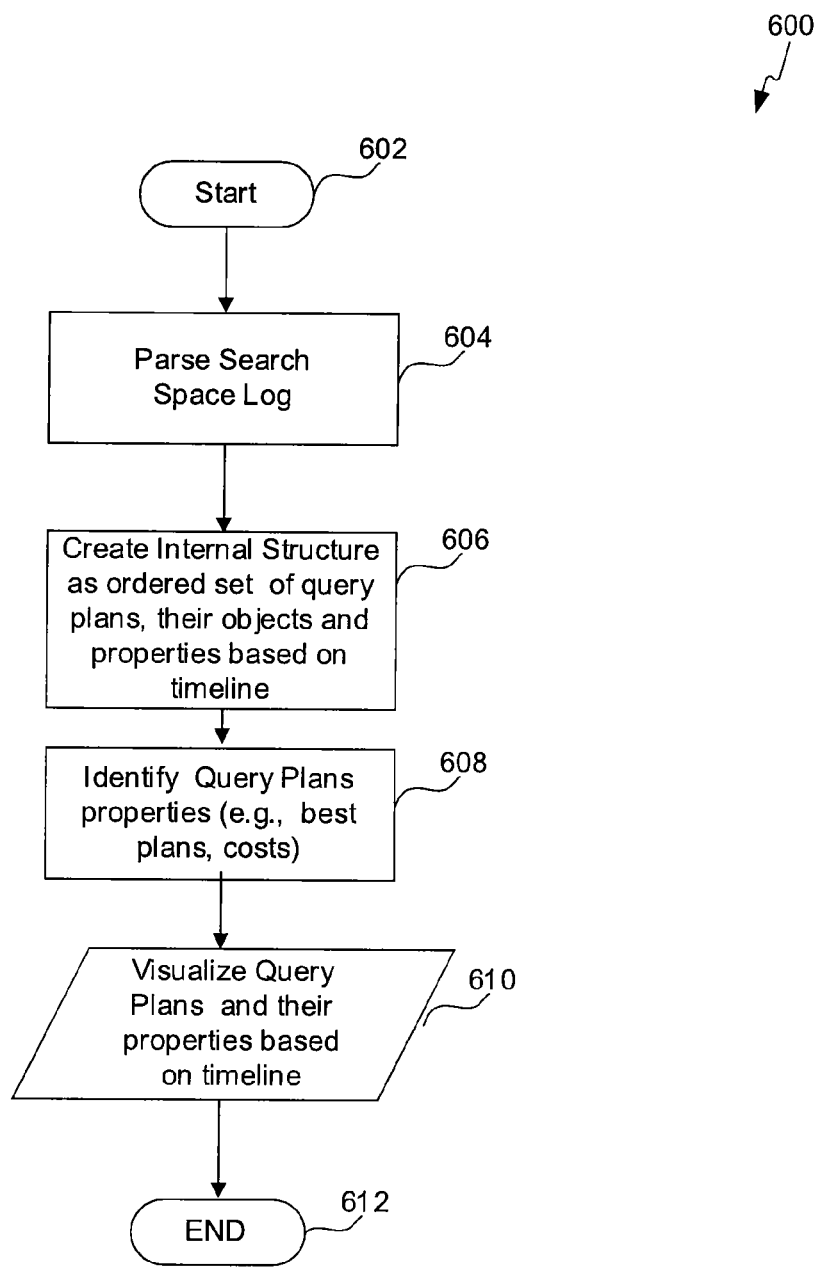
FIG. 6 is a flowchart illustrating steps by which a timeline is generated, in accordance with an embodiment of the present invention.

FIG. 6 is a flowchart 600 illustrating steps by which the timeline 400 is generated, in accordance with an embodiment of the present invention. The method begins at step 602 and proceeds to step 604 where the search space log is parsed according to the rules described in Section III. At step 606, the access plans evaluated are reconstructed into an internal representation in the order in which they were evaluated by the optimizer at the time the search space log was generated. At step 608 the properties of the access plan are identified such as, for example, by bolding the graphical representation of the access plan if it was a best plan. At step 610, the timeline is output to a display, in accordance with an embodiment of the present invention. The method ends at step 612.

The ability to view the optimizer's performance graphically benefits a number of applications. One such application is the ability to analyze performance issues using search space logs when customers' databases or their applications are not available. Another application is the ability to compare the qualities of old and new search spaces when new features are added which impact the search space generation algorithm of the query optimizer. A further application is the ability to compare the quality of the best plan obtained under typical use of the query optimizer with the best plan found by the same query optimizer when the exhaustive search is performed. An additional application is the ability to analyze the performance of the search space generation algorithm by measuring how early the final best plan was generated and how effective the pruning strategies were. This application enables a database architect to ensure that the final best plan is enumerated early in the process, allowing for aggressive pruning of whole subspaces as soon as their prefixes exceeded the low cost of this best plan. One skilled in the relevant arts will appreciate that additional applications exist, and the aforementioned applications are presented by way of example, and not limitation.

The graphical representation of the search space preserves features of the optimization process such as pruning decisions, the order the access plans were enumerated, the physical and logical properties for the access plans, and the best plans found. One skilled in the relevant arts will appreciate that additional information can be provided in the graphical representation, such as in the information box 500. By comparing two such graphical representations, it is possible to visualize the differences between two search spaces generated for the same statement by two different optimization processes.

VI. Example Computer System Implementation

Figure 7:
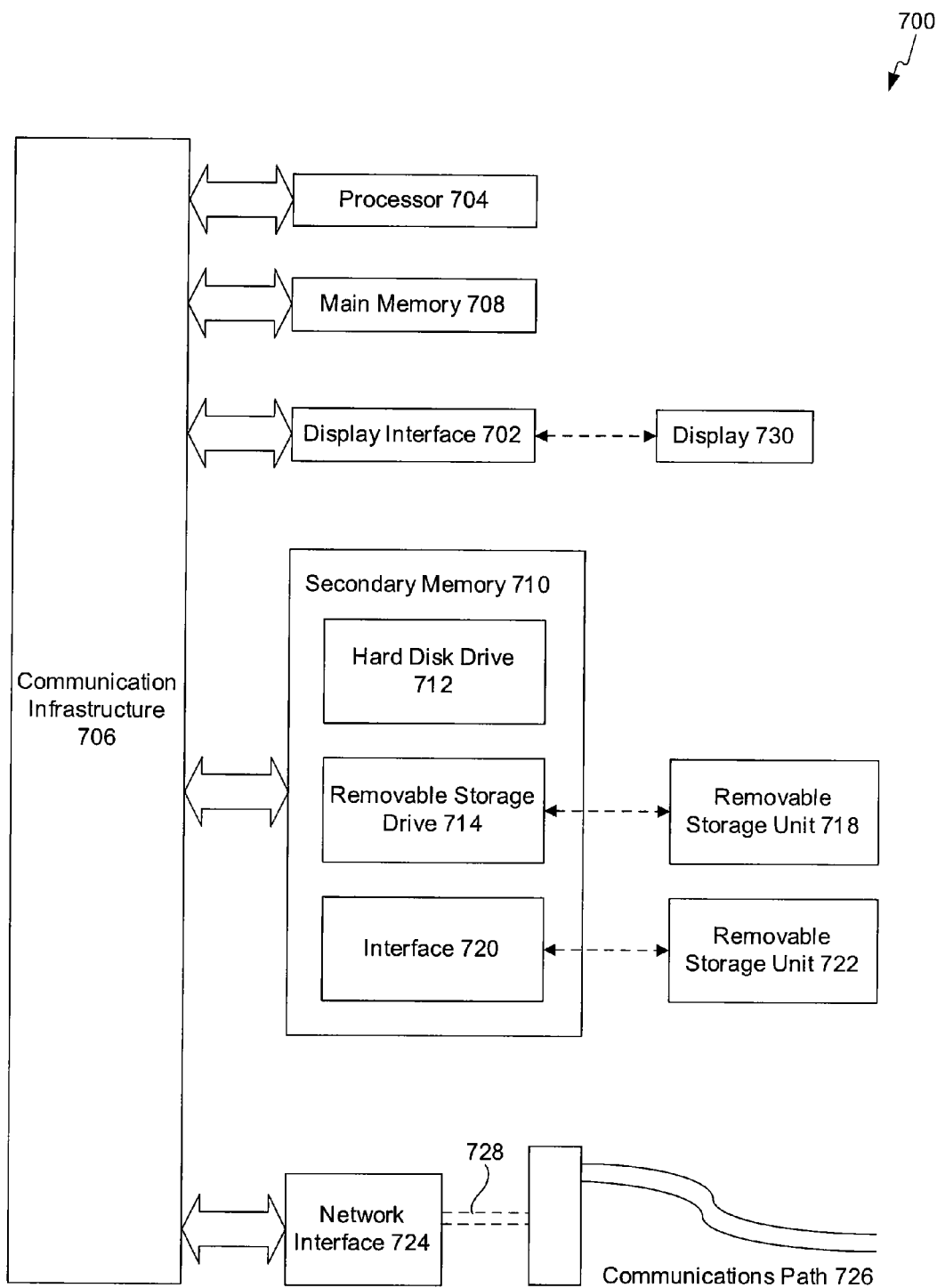
FIG. 7 depicts an example computer system in which embodiments of the present invention may be implemented.

Various aspects of the present invention can be implemented by software, firmware, hardware, or a combination thereof. FIG. 7 illustrates an example computer system 700 in which the present invention, or portions thereof, can be implemented as computer-readable code. For example, the methods illustrated by flowcharts 200 of FIG. 2 and 600 of FIG. 6, can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the steps in the methods illustrated by flowcharts 200 of FIG. 2 and 600 of FIG. 6, discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

XII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for generating a graphical representation of a query optimization process, the method comprising:
   parsing, by a computing device, a search space log, the log comprising an order in time in which one or more access plans were evaluated, a property for an object of one of the one or more evaluated access plans, and a best access plan selected from the one or more evaluated access plans;
   presenting the one or more evaluated access plans on a time axis and a cost axis of a timeline, organized on the timeline corresponding to the order in time in which the one or more evaluated access plans were evaluated;

identifying the best access plan on the timeline; and displaying a graphical representation of the time axis and the cost axis.

2. The method of claim 1, wherein the property for the object comprises an estimated total cost of the object.

3. The method of claim 2, wherein the log further comprises an estimated total cost of an access plan equal to the sum of the estimated total cost of objects of the access plan.

4. The method of claim 1, further comprising:
analyzing the graphical representation of the timeline; and
refining the query optimization process.

5. The method of claim 1, further comprising:
comparing the graphical representation of the timeline to a second graphical representation of a second timeline, the second timeline corresponding to a second search space log.

6. The method of claim 1, wherein presenting the one or more evaluated access plans on an axis of a timeline comprises presenting the one or more evaluated access plans as depicted by a graphical representation of objects of the one or more evaluated access plans.

7. A system for generating a graphical representation of a query optimization process, comprising:
a memory configured to store modules comprising:
a parsing module configured to parse a search space log, the log comprising an order in time in which one or more access plans were evaluated, a property for an object of one of the one or more evaluated access plans, and a best access plan selected from the one or more evaluated access plans,
a presenting module configured to present the one or more evaluated access plans on a time axis and a cost axis of a timeline, organized on the timeline corresponding to the order in time in which the one or more evaluated access plans were evaluated,
an identifying module configured to identify the best access plan on the timeline, and
a displaying module configured to display a graphical representation of the time axis and the cost axis; and
one or more processors configured to process the modules.

8. The system of claim 7, wherein the property for the object comprises an estimated total cost of the object.

9. The system of claim 8, wherein the log further comprises an estimated total cost of an access plan equal to the sum of the estimated total cost of objects of the access plan.

10. The system of claim 7, further comprising:
an analyzing module to analyze the graphical representation of the timeline; and
a refining module to refine the query optimization process.

11. The system of claim 7, further comprising:
a comparing module to compare the graphical representation of the timeline to a second graphical representation of a second timeline, the second timeline corresponding to a second search space log.

12. The system of claim 7, wherein the presenting module is further configured to present the one or more evaluated access plans as depicted by a graphical representation of objects of the one or more evaluated access plans.

13. A computer-usable storage device having computer program logic recorded thereon to cause a computing device to perform operations for generating a graphical representation of a query optimization process, the operations comprising:
parsing a search space log, the log comprising an order in time in which one or more access plans were evaluated, a property for an object of one of the one or more evaluated access plans, and a best access plan selected from the one or more evaluated access plans;
presenting the one or more evaluated access plans on a time axis and a cost axis of a timeline, organized on the timeline corresponding to the order in time in which the one or more evaluated access plans were evaluated;
identifying the best access plan on the timeline; and
displaying a graphical representation of the time axis and the cost axis.

14. The computer-usable storage device of claim 13, wherein the property for the object comprises an estimated total cost of the object.

15. The computer-usable storage device of claim 14, wherein the log further comprises an estimated total cost of an access plan equal to the sum of the estimated total cost of objects of the access plan.

16. The computer-usable storage device of claim 13, the operations further comprising:
analyzing the graphical representation of the timeline; and
refining the query optimization process.

17. The computer-usable storage device of claim 13, the operations further comprising:
comparing the graphical representation of the timeline to a second graphical representation of a second timeline, the second timeline corresponding to a second search space log.

18. The computer-usable storage device of claim 13, wherein presenting the one or more evaluated access plans on an axis of a timeline comprises presenting the one or more evaluated access plans as depicted by a graphical representation of objects of the one or more evaluated access plans.

19. A method for recording a query optimization process of a query optimizer, the method comprising:
generating, by a computing device, an access plan, the access plan comprising an object;
evaluating the access plan;
logging an object of the access plan;
logging a property for the object, the property comprising a cost;
logging an order in time in which the access plan was evaluated among one or more additional access plans;
logging a best access plan;
determining whether to evaluate an additional access plan;
logging a result of the determining whether to evaluate the additional access plan; and
configuring the object, the property, the order in time, the best access plan, and the result for a timeline displayed on a graphical representation of a time axis and a cost axis, wherein the access plan is organized on the timeline corresponding to the order in time in which the access plan was evaluated.

20. A system for recording a query optimization process of a query optimizer, comprising:
a memory configured to store modules comprising:
a generating module configured to generate an access plan, the access plan comprising an object,
an evaluating module configured to evaluate the access plan,
a first logging module configured to log an object of the access plan,
a second logging module configured to log a property for the object, the property comprising a cost,
a third logging module configured to log an order in time in which the access plan was evaluated among one or more additional access plans, a fourth logging module configured to log a best access plan, a determining module configured to determine whether to evaluate an additional access plan, and a fifth logging module configured to log a result of the determining whether to evaluate the additional access plan, and configuring the object, the property, the order in time, the best access plan, and the result for a timeline displayed on a graphical representation of a time axis and a cost axis, wherein the access plan is organized on the timeline corresponding to the order in time in which the access plan was evaluated; and one or more processors configured to process the modules.

21. A computer-usable storage device having computer program logic recorded thereon to cause a computing device to perform operations for recording a query optimization process of a query optimizer, the operations comprising:

generating an access plan, the access plan comprising an object;

evaluating the access plan;

logging an object of the access plan;

logging a property for the object, the property comprising a cost;

logging an order in time in which the access plan was evaluated among one or more additional access plans;

logging a best access plan;

determining whether to evaluate an additional access plan;

logging a result of the determining whether to evaluate the additional access plan; and configuring the object, the property, the order in time, the best access plan, and the result for a timeline displayed on a graphical representation of a time axis and a cost axis, wherein the access plan is organized on the timeline corresponding to the order in time in which the access plan was evaluated.

* * * * *